United States Patent
Krasner et al.

(10) Patent No.: US 11,625,327 B2
(45) Date of Patent: Apr. 11, 2023

(54) CACHE MEMORY MANAGEMENT

(71) Applicant: EMC IP Holding Company LLC, Hopkinton, MA (US)

(72) Inventors: John Krasner, Coventry, RI (US); Ramesh Doddaiah, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/709,013

(22) Filed: Dec. 10, 2019

(65) Prior Publication Data

US 2021/0173782 A1 Jun. 10, 2021

(51) Int. Cl.
*G06F 12/0862* (2016.01)
*G06N 3/04* (2006.01)
*G06F 12/0893* (2016.01)

(52) U.S. Cl.
CPC ...... *G06F 12/0862* (2013.01); *G06F 12/0893* (2013.01); *G06N 3/0445* (2013.01); *G06F 2212/602* (2013.01)

(58) Field of Classification Search
CPC ............ G06F 12/0862; G06F 12/0893; G06F 2212/602; G06N 3/0445
See application file for complete search history.

(56) References Cited

U.S. PATENT DOCUMENTS

| | | | | |
|---|---|---|---|---|
| 5,802,600 | A * | 9/1998 | Smith | G06F 12/0866 711/129 |
| 6,822,961 | B1 * | 11/2004 | Constantinof | H04L 12/56 370/395.2 |
| 8,112,586 | B1 * | 2/2012 | Reiner | G06F 12/0897 711/122 |
| 9,485,323 | B1 * | 11/2016 | Stickle | H04L 67/02 |
| 9,544,388 | B1 * | 1/2017 | Li | H04L 65/60 |
| 9,852,076 | B1 * | 12/2017 | Garg | G06F 3/067 |
| 2003/0105926 | A1 * | 6/2003 | Rodriguez | G06F 12/04 711/137 |
| 2009/0157378 | A1 * | 6/2009 | Boldyrev | G06F 11/008 703/22 |
| 2012/0254459 | A1 * | 10/2012 | Maddah-Ali | H04L 67/568 709/236 |
| 2013/0103911 | A1 * | 4/2013 | Bulut | G06F 12/0866 711/144 |

(Continued)

*Primary Examiner* — Prasith Thammavong
(74) *Attorney, Agent, or Firm* — Krishnendu Gupta; Nikhil Patel

(57) ABSTRACT

Embodiments of the present disclosure relate to cache memory management. Based on anticipated input/output (I/O) workloads, at least one or more of: sizes of one or more mirrored and un-mirrored caches of global memory and their respective cache slot pools are dynamically balanced. Each of the mirrored/unmirrored caches can be segmented into one or more cache pools, each having slots of a distinct size. Cache pool can be assigned an amount of the one or more cache slots of the distinct size based on the anticipated I/O workloads. Cache pools can be further assigned the amount of distinctly sized cache slots based on expected service levels (SLs) of a customer. Cache pools can also be assigned the amount of the distinctly sized cache slots based on one or more of predicted I/O request sizes and predicted frequencies of different I/O request sizes of the anticipated I/O workloads.

20 Claims, 5 Drawing Sheets

(56) References Cited

U.S. PATENT DOCUMENTS

| | | | | |
|---|---|---|---|---|
| 2014/0237188 A1* | 8/2014 | Tran | H04L 67/2842 | |
| | | | 711/126 | |
| 2015/0081981 A1* | 3/2015 | McKean | G06F 12/123 | |
| | | | 711/136 | |
| 2015/0089034 A1* | 3/2015 | Stickle | H04L 41/18 | |
| | | | 709/223 | |
| 2015/0134916 A1* | 5/2015 | Padalikar | G06F 12/0888 | |
| | | | 711/138 | |
| 2016/0019156 A1* | 1/2016 | Feldman | G06F 12/0871 | |
| | | | 711/129 | |
| 2016/0034394 A1* | 2/2016 | McKean | G06F 12/0891 | |
| | | | 709/217 | |
| 2017/0235663 A1* | 8/2017 | Kattepur | G06F 11/3433 | |
| | | | 717/131 | |
| 2017/0373955 A1* | 12/2017 | Kocoloski | G06F 9/4893 | |
| 2019/0243570 A1* | 8/2019 | Mittal | G06F 3/068 | |
| 2019/0243695 A1* | 8/2019 | Mittal | G06F 9/546 | |
| 2019/0253520 A1* | 8/2019 | Maharana | G06N 3/08 | |

\* cited by examiner

500 dynamically balancing sizes of one or more mirrored and un-mirrored caches of global memory based on anticipated input/output (I/O) workloads

CACHE MEMORY MANAGEMENT

BACKGROUND

Memory management is a form of resource management applied to computer memory. Memory management can be used to provide ways to dynamically allocate portions of memory to programs at their request, and free it for reuse when no longer needed. Enabling more efficient memory management can be important to computer systems where more than a single process might be underway at any time.

SUMMARY

One or more aspects of the present disclosure relates to cache memory management. Based on anticipated input/output (I/O) workloads, at least one or more of: sizes of one or more mirrored and un-mirrored caches of global memory and their respective cache slot pools are dynamically balanced.

In embodiments, each of the one or more mirrored and un-mirrored caches can be segmented into one or more cache pools. Each of the cache pools can have a distinct size.

In embodiments, each cache pool can be assigned an amount of the one or more cache slots of the distinct size based on the anticipated I/O workloads.

In embodiments, each cache pool can be further assigned the amount of distinctly sized cache slots based on expected service levels (SLs) of a customer.

In embodiments, the I/O workloads can be anticipated using one or more neural network machine learning techniques.

In embodiments, one of the one or more neural network machine learning techniques can be a recurring neural network (RNN) such as a long/short-term memory (LSTM) network.

In embodiments, distinct I/O request sizes of the anticipated I/O workloads can be predicted.

In embodiments, frequencies of different I/O request sizes of the anticipated I/O workloads can be predicted.

In embodiments, each cache pool can also be assigned an amount of the distinctly sized cache slots based on one or more of the predicted I/O request sizes and the predicted frequencies of different I/O request sizes of the anticipated I/O workloads.

In embodiments, each cache pool can be assigned the amount of the one or more distinctly sized cache slots of the distinct based on expected service levels (SLs) of a customer.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a flow diagram of a method for cache memory management in accordance with example embodiments disclosed herein.

DETAILED DESCRIPTION

Storage devices can include global memory configured to store data to facilitate certain storage device operations. The operations can require that the stored data be easily and quickly accessible. Accordingly, the global memory can include volatile (e.g., non-persistent) cache memory having mirrored and unmirrored cache slots having fast data read/write response times. Data stored in mirrored cache slots are copied in cache slots of other storage devices to, e.g., provide a solution for rapid, reliable, robust, automatic failover. Data stored in unmirrored cache slots are not copied. Generally, write data is stored in mirrored cache slots, while read data is stored in unmirrored cache slots because the read data is an inherent copy of data stored in a storage device's disk (e.g., persistent memory).

The mirrored and unmirrored caches can each have different amounts of assigned cache slots. The assigned cache slots of each of the mirrored and unmirrored caches can be segmented into one or more pools of varying cache slot sizes (e.g., 128K, 64K, 16k, and 8K).

The storage devices can use memory management techniques to store input/output (I/O) operations into a cache pool of the mirrored or unmirrored caches based on I/O size. For example, I/O sizes greater than 64K would be stored in a pool comprising 128K cache slots.

Current naïve memory management techniques use statically sized cache slots, which can result in inefficient memory utilization. For example, an 8K sized cache pool may be full and, thus, an 8K I/O operation may need be stored in, e.g., a cache slot of a 128K cache pool. Accordingly, the 128K cache slot would be underutilized as it would have 120k of available space that cannot be used until the 8K I/O operation is processed by the storage device.

Embodiments of the present disclosure relate to cache memory management techniques that dynamically balance a global memory's mirrored and unmirrored caches and/or their respective cache slot pools. The techniques can also further dynamically balance differing cache slot sized pools. For example, the techniques can use create a 128K cache slot pool using cache slots of smaller size (e.g., 64K, 16k, or 8K) based on anticipated workloads and their respective patterns of I/O sizes. Advantageously, the disclosed dynamic cache balancing techniques achieve greater memory utilization than current approaches. Such greater memory utilization also enables a storage device to process both larger workloads and a greater number of workloads. For example, the dynamic cache balancing techniques improve a storage device's I/O response time during peak workload periods.

Figure 1:
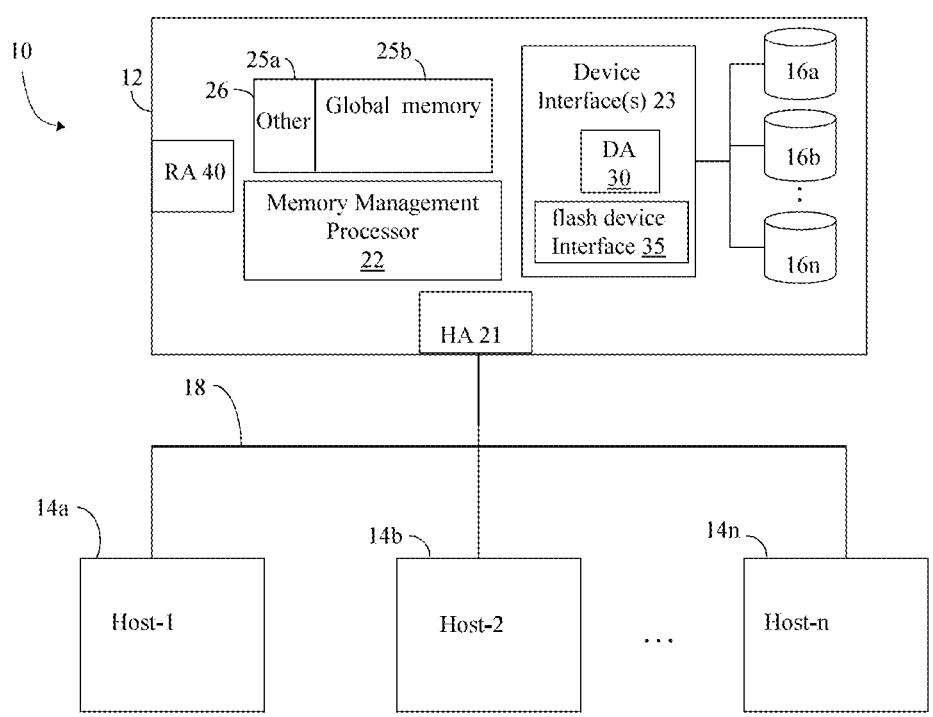
FIG. 1 is a block diagram of an example a storage system in accordance with example embodiments disclosed herein.

Referring to FIG. 1, shown is an example system 10 that may be used in connection with performing embodiments of the present disclosure described herein. The system 10 includes a data storage system 12 connected to host systems 14*a*-14*n* through communication medium 18. In embodiments, the hosts 14*a*-14*n* can access the data storage system 12, for example, to perform input/output (I/O) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the embodiments herein. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The embodiments described herein can be used in an embodiment in which one or more of the devices 16a-16n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14*a-n*. The RA 40 may be used in facilitating communications between two data storage arrays. The DA 30 may be one type of device interface used in connection with facilitating data transfers to/from the associated disk drive(s) 16*a-n* and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16*a*-16*n*. In the following description, data residing on an LV may be accessed by the device interface following a data request in connection with I/O operations that other directors originate. Data may be accessed by LV in which a single device interface manages data requests in connection with the different one or more LVs that may reside on a drive 16*a*-16*n*. For example, a device interface may be a DA 30 that accomplishes the foregoing by creating job records for the different LVs associated with a device. These different job records may be associated with the different LVs in a data structure stored and managed by each device interface.

Figure 2:
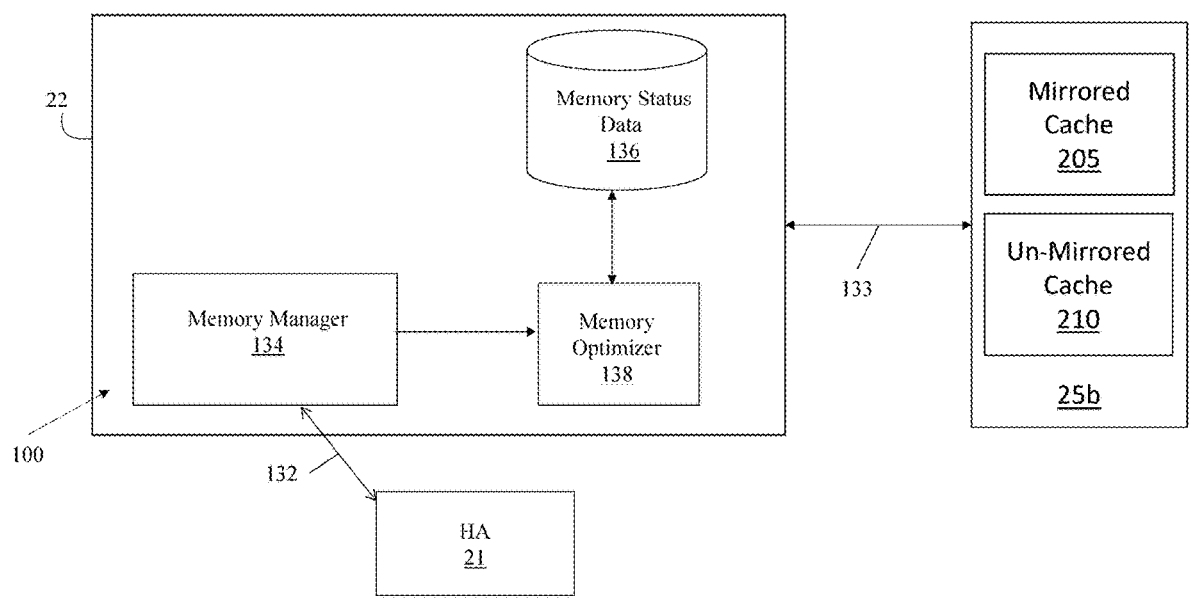
FIG. 2 is a block diagram of a memory management processor (MMP) in accordance with example embodiments disclosed herein.
Figure 3:
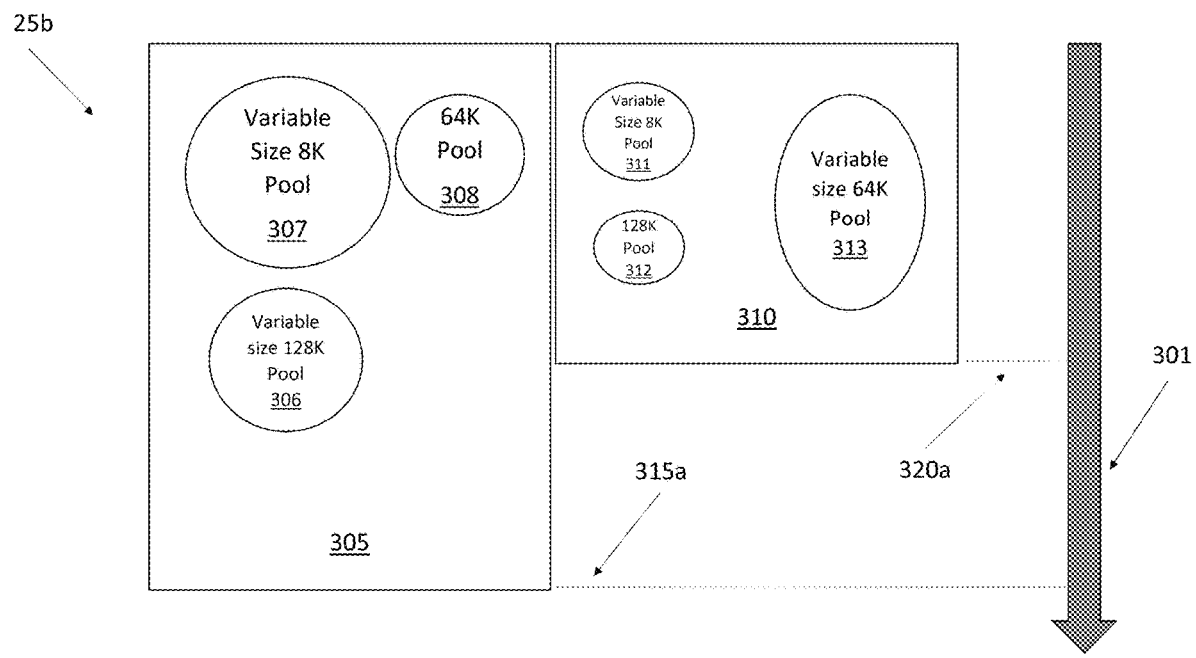
FIG. 3 is a block diagram of mirrored and unmirrored memory of a storage system in accordance with example embodiments disclosed herein.

A memory management processor 22 can manage utilization of the global memory 25*b* by, e.g., dynamically balancing the global memory's mirrored and unmirrored caches (e.g., mirrored cache 205 and unmirrored cache 210 of FIG. 2) and/or their respective differently sized cache slot pools (e.g. pools 306-08, 311-313 of FIG. 3). In one embodiment, the memory management processor 22 can monitor the storage system's received I/O operations to predict and anticipate I/O workloads and their respective patterns of I/O types and sizes. Based on the predicted/anticipated I/O workload and/or its corresponding pattern of I/O types and sizes, the memory management processor 22 can dynamically adjust cache slots assigned to the storage system's mirrored and unmirrored caches as described in greater detail herein. The memory management processor can further dynamically adjust amounts of cache slots assigned to each of the mirrored/unmirrored's differently sized cache pools as described in greater detail herein.

In embodiments, each cache slot pool can be comprised of cache slot segments having a smaller size than the pool size itself. For example, a 128K cache slot pool can be comprised of one or more of 64K, 28K, 16k, and 8K cache slot segments that are combined to form each 128K cache slot. The size of each cache slot segment can be pre-determined based on each storage device's respective customer profile and service level agreements (SLAs). For example, financial customers may process workloads having different patterns I/O types and sizes than those of streaming video customers of the storage devices. In embodiments, historical workloads of storage device customers corresponding to any industry can be analyzed to predict workloads to predetermine cache slot segment sizes for a specific customer. The analysis can be performed using any machine learning processing network and/or technique. Additionally, each customer may have a SL (e.g., performance) expectation of the storage device 12. The SL expectation can correspond to one or more response time envelopes for each application the customer may use. Accordingly, an I/O operation can be categorized according to the expected response time envelope of the application from which it originated. Each category can correspond to a unique response time envelope and have an SL assignment such as PLATINUM, GOLD, SILVER, and BRONZE. In embodiments, PLATINUM can correspond to the fastest response time envelopes, while BRONZE can correspond to the slowest response time envelopes. Each other SL assignment can thus have response time envelopes between those corresponding to PLATINUM and BRONZE SL assignments.

Although the memory management processor 22 is depicted within the system 12, it should be noted that a memory management processor 22 may exist external to the data storage system 12. Accordingly, the processor 22 may communicate with the data storage system 12 using any one of a variety of communication connections. In one embodiment, the memory management processor 22 may communicate with the data storage system 12 through three different connections, a serial port, a parallel port and using a network interface card, for example, with an Ethernet connection. Using the Ethernet connection, for example, a memory management processor may communicate directly with DA 30 and HA 21 within the data storage system 12.

Referring to FIG. 2, a memory management processor 22 of a storage device (e.g., device 12 of FIG. 1) can include elements 100 (e.g., software and hardware elements). It should be noted that the memory management processor 22 may be any one of a variety of commercially available processors, such as an Intel-based processor, and the like. In embodiments, the memory management processor 22 can be a parallel processor such as a graphical processing unit (GPU). Although what is described herein shows details of software that may reside in the memory management processor 22, all or portions of the illustrated components may also reside elsewhere such as on, for example, HA 21 of FIG. 1.

The memory management processor 22 can include memory manager 134 that can gather and store memory status data 136 of, e.g., global memory 25*b* via connection 133. Memory status data 136 can include memory class information, capacity information, metadata regarding data units stored in each unit of memory, cache pool types and sizes, and cache slot segment sizes amongst other known types of memory status data. The manager 134 can monitor input/output (I/O) streams that include operations such as read/write operations through connection 132 with HA 21.

Using one or more machine learning techniques, the memory manager 134 can further analyze historical and current I/O workloads to anticipate I/O workloads that the storage device can expect to receive in one or more future time-windows. The memory manager 134 can define the anticipated workloads based on I/O types, I/O sizes, and SLs associated with each I/O, activity types, amongst other parameters and patterns of each parameter (e.g., frequency). Activity types can be one or more of Online Transaction Processing (OLTP), Teradata, random, and sequential I/O streams.

In embodiments, the manager 135 can use a recurring neural network (RNN) to analyze the historical and current I/O workloads. The RNN can be a Long Short Term Memory (LSTM) network that anticipates the workloads based on historical/current I/O workload input parameters. The input parameters can include I/O types and sizes, logical block address (LBA), response times, I/O data types, I/O payloads, and time of any observed I/O pattern, amongst other input parameters.

Based on one or more of the anticipated workloads, a customer's SLA, and memory status data 136, a memory optimizer 138 can dynamically balance one or more of mirrored and unmirrored cache segments 205, 210 of the storage device's global memory 25*b* and each cache segment's corresponding cache pools (e.g., pools 306-308, 311-313 of FIG. 3). For example, the optimizer 138 can re-allocate amounts of cache assigned to the each of the global memory's mirrored and unmirrored cache segments and their respective cache pool sizes based on the anticipated workloads as described in greater detail herein.

Referring to FIG. 3, a global memory 25*b* of a storage device (e.g., device 12 of FIG. 1) can include a mirrored memory segment 305 and an unmirrored memory segment 310. A memory management processor (e.g., processor 22 of FIG. 2) can be configured to balance each of the segments 305, 310 to have a respective cache segment sizes 315*a*, 320*a* according a cache segment size scale 301. The cache segment sizes 315*a*, 320*a* of each segment 305, 310 can correspond to a first anticipated workload the memory management processor expects the storage device to receive during a first time-window. The first time-window can, e.g., correspond to a period during operational business hours of a customer. During the first time-window, the memory management processor may predict the first anticipated workload to include a larger percentage of write vs read I/O operations. As stated herein, write data is generally stored in mirrored cache slots to ensure copies exist in case of an error caused by, e.g., power loss, failover, and a data breach, amongst other factors. Accordingly, the memory management processor may allocate a greater number of cache slots to the global memory's mirrored segment 305 vs the global memory's unmirrored segment 310.

Further, the memory management processor may predict that the first anticipated write workload is likely to include, from greatest to lowest in frequency, write I/O sizes of 8K, 64K, and 128K. Similarly, the processor may predict that the first anticipated read workload is likely to include, from greatest to lowest in frequency, read I/O sizes of 64K, 128K, and 8K. Based on the predicted read/write workloads, the processor allocates cache slot segments to each of the cache pools 306-308, 311-313.

Figure 4:
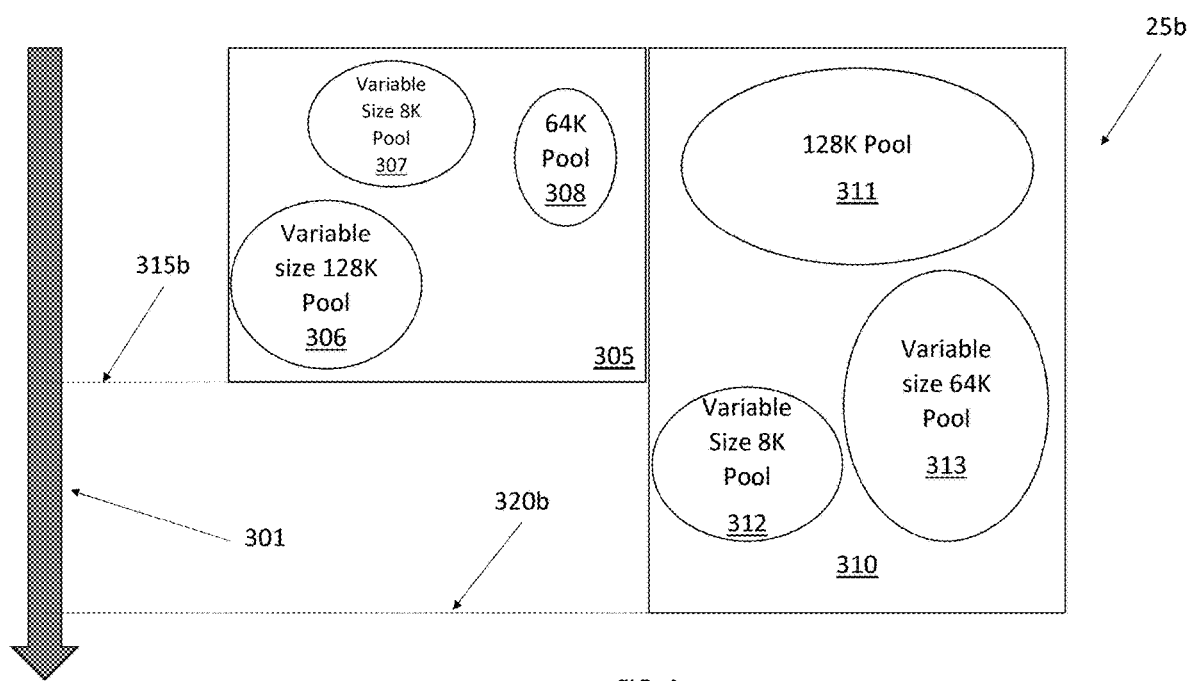
FIG. 4 is another block diagram of mirrored and unmirrored memory of a storage system in accordance with example embodiments disclosed herein.

Referring to FIG. 4, the memory management processor is configured to re-balance the mirrored and unmirrored memory segments 305, 310 to re-balanced respective sizes 315*b*, 320*b* based on, e.g., a second anticipated workload it expects the storage device to receive during a second time-window. The second time-window can correspond to, e.g., end of day business operations of the customer. During the second time-window, the memory management processor may predict the second anticipated workload to include a larger percentage of read vs write I/O operations. As stated herein, read data is generally stored in unmirrored cache slots because the data is typically read from disk, which inherently includes original copies of the read data. Accordingly, the memory management processor may allocate a greater number of cache slots to the global memory's unmirrored segment 310 vs the global memory's mirrored segment 315.

Further, the memory management processor may predict that the first anticipated write workload is likely to include, from greatest to lowest in frequency, write I/O sizes of 128K, 8K, and 64K. Similarly, the processor may predict that the first anticipated read workload is likely to include, from greatest to lowest in frequency, read I/O sizes of 128K, 64K, and 8K. Based on the predicted read/write workloads, the processor re-allocates cache slot segments to each of the cache pools 306-308, 311-313.

FIG. 5 illustrates a methods and/or flow diagram in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Referring to FIG. 5, in embodiments, a method 500 can be executed by a memory management processor (e.g., the memory management processor 22 of FIG. 1). At 505, the method 500 can include dynamically balance sizes of one or more mirrored and un-mirrored caches of global memory based on anticipated input/output (I/O) workloads. Sizes of one or more mirrored and un-mirrored caches of global memory are dynamically balanced. Each of the one or more mirrored and un-mirrored caches can be segmented into one or more cache pools. Each of the cache pools can have a distinct size. Each cache pool can be assigned an amount of the one or more cache slots of the distinct size based on the anticipated I/O workloads. Each cache pool can be further assigned the amount of distinctly sized cache slots based on expected service levels (SLs) of a customer. Each cache pool can also be assigned the amount of the distinctly sized cache slots based on one or more of predicted I/O request sizes and predicted frequencies of different I/O request sizes of the anticipated I/O workloads. The I/O workloads can be anticipated using one or more neural network machine learning techniques. One of the one or more neural network machine learning techniques can be a recurring neural network (RNN) such as a long/short-term memory (LSTM) network. Distinct I/O request sizes of the anticipated I/O workloads can be predicted. Frequencies of different I/O request sizes of the anticipated I/O workloads can be predicted.

It should be noted that the method 500 can be performed according to any of the embodiments described herein, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
    monitor one or more input/output (I/O) workloads received by a storage array;
    predict each distinct size of the I/O workload's I/O operations;
    anticipate a frequency for each of the I/O workload's distinctly sized I/O operations;
    establish one or more mirrored and unmirrored cache pools (MUCPs), wherein each MUCP's cache slot width is sized according to the anticipated frequency of the I/O workload's distinctly sized I/O operations;
    establish, for each MUCP, a plurality of cache slot segments having sizes smaller than the width of their respective cache, wherein each MUCP includes two or more distinctly sized cache slot segments, where the combined width of each distinct size equals the size of their corresponding MUCP; and
    dynamically balance and reallocate the cache slot segments to the one or more MUCPs according to the anticipated frequency of the I/O workload's distinctly sized I/O operations.

2. The apparatus of claim 1 further configured to segment each of the one or more mirrored and un-mirrored caches into the one or more cache pools, wherein each cache pool includes one or more cache slots of a distinct size.

3. The apparatus of claim 2 further configured to assign each cache pool an amount of the one or more cache slots of the distinct size based on the anticipated I/O workloads.

4. The apparatus of claim 3 further configured to assign each cache pool the amount of the one or more distinctly sized cache slots based on expected service levels (SLs) of a customer.

5. The apparatus of claim 1 further configured to anticipate the I/O workloads using one or more neural network machine learning techniques.

6. The apparatus of claim 5, wherein one of the one or more neural network machine learning techniques is a recurring neural network (RNN) such as a long/short-term memory (LSTM) network.

7. The apparatus of claim 2 further configured to predict distinct I/O request sizes of the anticipated I/O workloads.

8. The apparatus of claim 7 further configured to predict frequencies of different I/O request sizes of the anticipated I/O workloads.

9. The apparatus of claim 8 further configured to assign each cache pool an amount of the one or more cache slots of the distinct size based on one or more of the predicted I/O request sizes and the predicted frequencies of the different I/O request sizes of the anticipated I/O workloads.

10. The apparatus of claim 9 further configured to assign each cache pool the amount of the one or more distinctly sized cache slots of the distinct based on expected service levels (SLs) of a customer.

11. A method comprising:
monitoring one or more input/output (I/O) workloads received by a storage array;
predicting each distinct size of the I/O workload's I/O operations;
anticipating a frequency for each of the I/O workload's distinctly sized I/O operations;
establishing one or more mirrored and unmirrored cache pools (MUCPs), wherein each MUCP's cache slot width is sized according to the anticipated frequency of the I/O workload's distinctly sized I/O operations;
establishing, for each MUCP, a plurality of cache slot segments having sizes smaller than the width of their respective cache, wherein each MUCP includes two or more distinctly sized cache slot segments, where the combined width of each distinct size equals the size of their corresponding MUCP; and
dynamically balancing and reallocating the cache slot segments to the one or more MUCPs according to the anticipated frequency of the I/O workload's distinctly sized I/O operations.

12. The method of claim 11 further comprising segmenting each of the one or more mirrored and un-mirrored caches into one or more cache pools, each cache pool having one or more cache slots of a distinct size.

13. The method of claim 12 further comprising assigning each cache pool an amount of the one or more cache slots of the distinct size based on the anticipated I/O workloads.

14. The method of claim 13 further comprising assigning each cache pool the amount of the one or more distinctly sized cache slots based on expected service levels (SLs) of a customer.

15. The method of claim 11 further comprising anticipating the I/O workloads using one or more neural network machine learning techniques.

16. The method of claim 15, wherein one of the one or more neural network machine learning techniques is a recurring neural network (RNN) such as a long/short-term memory (LSTM) network.

17. The method of claim 12 further comprising predicting distinct I/O request sizes of the anticipated I/O workloads.

18. The method of claim 17 further comprising predicting frequencies of different I/O request sizes of the anticipated I/O workloads.

19. The method of claim 18 further comprising assigning each cache pool an amount of the one or more cache slots of the distinct size based on one or more of the predicted I/O request sizes and the predicted frequencies of the different I/O request sizes of the anticipated I/O workloads.

20. The method of claim 19 further comprising assigning each cache pool the amount of the one or more distinctly sized cache slots of the distinct based on expected service levels (SLs) of a customer.

* * * * *